US009749158B2

(12) United States Patent
Pan et al.

(10) Patent No.: US 9,749,158 B2
(45) Date of Patent: Aug. 29, 2017

(54) VARIABLE FEEDBACK FOR UNIVERSAL TERRESTRIAL RADIO ACCESS

(75) Inventors: Kyle Jung-Lin Pan, Smithtown, NY (US); Robert Lind Olesen, Huntington, NY (US); Donald M. Grieco, Manhassett, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 2042 days.

(21) Appl. No.: 11/746,330

(22) Filed: May 9, 2007

(65) Prior Publication Data

US 2007/0265037 A1 Nov. 15, 2007

Related U.S. Application Data

(60) Provisional application No. 60/799,070, filed on May 9, 2006.

(51) Int. Cl.
*H04W 4/00* (2009.01)
*H04L 25/03* (2006.01)
*H04B 7/0456* (2017.01)
*H04B 7/06* (2006.01)

(52) U.S. Cl.
CPC ..... *H04L 25/03343* (2013.01); *H04B 7/0456* (2013.01); *H04B 7/0669* (2013.01); *H04B 7/0673* (2013.01); *H04L 2025/03426* (2013.01); *H04L 2025/03808* (2013.01)

(58) Field of Classification Search
CPC .. H04B 7/0456; H04B 7/0639; H04B 7/0478; H04B 7/0626; H04B 7/0417; H04B 7/0632; H04B 7/0404; H04B 7/0452; H04B 7/0663

USPC .................................................. 455/63, 102
See application file for complete search history.

(56) References Cited

U.S. PATENT DOCUMENTS

| | | | |
|---|---|---|---|
| 7,035,243 B2 | 4/2006 | Shpak | |
| 7,096,181 B2 | 8/2006 | Jung et al. | |
| 2003/0185309 A1 | 10/2003 | Pautler et al. | |
| 2005/0286663 A1* | 12/2005 | Poon | 375/347 |
| 2006/0056531 A1* | 3/2006 | Li et al. | 375/267 |
| 2006/0092054 A1* | 5/2006 | Li et al. | 341/67 |
| 2007/0049218 A1* | 3/2007 | Gorokhov et al. | 455/102 |
| 2007/0097910 A1* | 5/2007 | Ji et al. | 370/329 |
| 2007/0098099 A1* | 5/2007 | Gore et al. | 375/260 |
| 2007/0174038 A1* | 7/2007 | Wang et al. | 704/1 |
| 2007/0195974 A1* | 8/2007 | Li et al. | 381/94.3 |
| 2007/0217540 A1* | 9/2007 | Onggosanusi et al. | 375/267 |

(Continued)

FOREIGN PATENT DOCUMENTS

WO WO2007/050861 5/2007

OTHER PUBLICATIONS

3GPP, *3rd Generation Partnership Project; Technical Specification Group Radio Access Network; Physical Layer Aspects for Evolved UTRA* (Release 7), 3GPP TR25.814 V1.2.2 (Mar. 2006), (Mar. 2006).

(Continued)

*Primary Examiner* — Kwasi Karikari
(74) *Attorney, Agent, or Firm* — Theodore Naccarella

(57) ABSTRACT

A wireless communication system includes a wireless transmit/receive unit (WTRU). The WTRU is configured to generate at least one local codebook based on a baseline codebook, and select a codeword from the local codebook that is associated with feedback.

8 Claims, 5 Drawing Sheets

(56) References Cited

U.S. PATENT DOCUMENTS

2009/0129502 A1* 5/2009 Tong et al. ............... 375/299
2009/0326933 A1* 12/2009 Lin et al. .................. 704/223

OTHER PUBLICATIONS

Zhang et al., "A Tracking Approach for Precoded MIMO-OFDM Systems with Low Data Rate CSI Feedback," Personal, Indoor, and Mobile Communications, pp. 241-245 (Sep. 14, 2005).
"Chinese Office Action", 200780016915.X, Jan. 23, 2013, 6 pages.
"Chinese Office Action (Translation)", 200780016915.X, Jan. 23, 2013, 8 pages.
Heath et al., "What is the Value of Limited Feedback for MIMO Channels?" IEEE Communications Magazine, vol. 42, No. 10, Oct. 2004, pp. 54-59.
Samanta et al., "Codebook Adaptation for Quantized MIMO Beamforming Systems," Signals, Systems and Computers, Conference Record of the Thirty-Ninth Asilmar Conference in Pacific Grove, California, Oct. 28, 2005, pp. 376-380.
Third Generation Partnership Project, "Technical Specification Group Radio Access Network; Physical Layer Aspects for Evolved UTRA (Release 7)," 3GPP TR 25.814 v1.2.2 (Mar. 2006).
Third Generation Partnership Project, "Technical Specification Group Radio Access Network; Physical Channels and Modulation (Release 8)," 3GPP TS 36.211 V1.0.0 (Mar. 2007).
Third Generation Partnership Project, "Technical Specification Group Radio Access Network; Physical layer procedures (Release 8)," 3GPP TS 36.213 V1.0.0 (Mar. 2007).
Zhou et al., "Recursive and Trellis-based Feedback Reduction for MIMO-OFDM with Transmit Beamforming," IEEE Global Telecommunications Conference (Dec. 2, 2005).
Samanta et al., "Codebook Adaptation for Quantized MIMO Beamforming Systems," Signals, Systems and Computers, Conference Record of the Thirty-Ninth Asilmar Conference in Pacific Grove, Califorina, Oct. 28, 2005, pp. 376-380.
"Korean Office Action", Korean Patent Application No. 10-2008-7029930, 4 pages (see item 2 below).
"Korean Office Action (Translation)", Korean Patent Application No. 10-2008-7029930, 5 pages.
"MIMO OFDMA E-UTRA Proposal for Different Antenna Configurations", 3GPP TSG RAN WG1 #43, R1-051315, Seoul, Korea Nov. 7-11, 2005, Texas Instruments, Nov. 2005, 6 pages.
"MIMO techniques for Downlink E-UTRA", TSG-RAN WG1 Meeting #43, R1-051455, Seoul, Republic of Korea, Nov. 7-11, 2005, NEC Group, Nov. 2005, 5 pages.
"Official Notice of Final Decision of Rejection", Japanese Patent Application No. 2009-09825, 3 pages (see item 6 below).
"Official Notice of Final Decision of Rejection (Translation)", Japanese Patent Application No. 2009-509825, 4 pages.
Samanta, Roopsha et al., "Codebook Adaption for Quantized MIMO Beamforming Systems", Wireless Networking and Communications Group. Dept. of Electrical and Computer Engineering. The University of Texas at Austin. 1-4244-0132-1/05 IEEE, 2005, 5 pages.

* cited by examiner ations.
VARIABLE FEEDBACK FOR UNIVERSAL TERRESTRIAL RADIO ACCESS

CROSS REFERENCE TO RELATED APPLICATION

This application claims the benefit of U.S. provisional application No. 60/799,070, filed May 9, 2006, which is incorporated by reference as if fully set forth.

FIELD OF INVENTION

The present invention relates generally to the field of wireless communications. More specifically, the present invention relates to variable feedback in a wireless communication system.

BACKGROUND

3GPP and 3GPP2 are standards bodies that are considering the long term evolution of wireless communication systems. The bodies have promulgated specifications for feedback in next generation networks.

In particular, wireless specification 3GPP 25.814 provides that, for any additional feedback required for preceding, any related computational complexity that is incurred due to the additional feedback should be taken into account.

Further, the specification states that a codebook based feedback method should select a pre-coding vector from a codebook in order to reduce signaling overhead. The size of the codebook should be minimized and the codebook should be static.

Irrespective of whether a codebook is used, the amount of feedback should be minimized. Furthermore, an update interval of the selected pre-coding vector should be sufficiently short to track instantaneous channel variation. Thus, efficient methods for feedback are desirable for next generation wireless networks, particularly multiple-input/multiple-output (MIMO) systems.

SUMMARY

The present invention includes a method and apparatus for variable feedback in a wireless communication system. The method and apparatus include the use of a baseline codebook and local codebooks. The local codebooks are subsets of the baseline codebooks. The local codebooks include codewords that are chosen based on certain criteria.

BRIEF DESCRIPTION OF THE DRAWING(S)

A more detailed understanding of the invention may be had from the following description of a preferred embodiment, given by way of example and to be understood in conjunction with the accompanying drawing(s) wherein.

DETAILED DESCRIPTION OF THE PREFERRED EMBODIMENT(S)

When referred to hereafter, the terminology "wireless transmit/receive unit (WTRU)" includes but is not limited to a user equipment (UE), a mobile station, a fixed or mobile subscriber unit, a pager, a cellular telephone, a personal digital assistant (PDA), a computer, or any other type of user device capable of operating in a wireless environment. When referred to hereafter, the terminology "base station" includes but is not limited to a Node-B, a site controller, an access point (Base station), or any other type of interfacing device capable of operating in a wireless environment.

Figure 1:
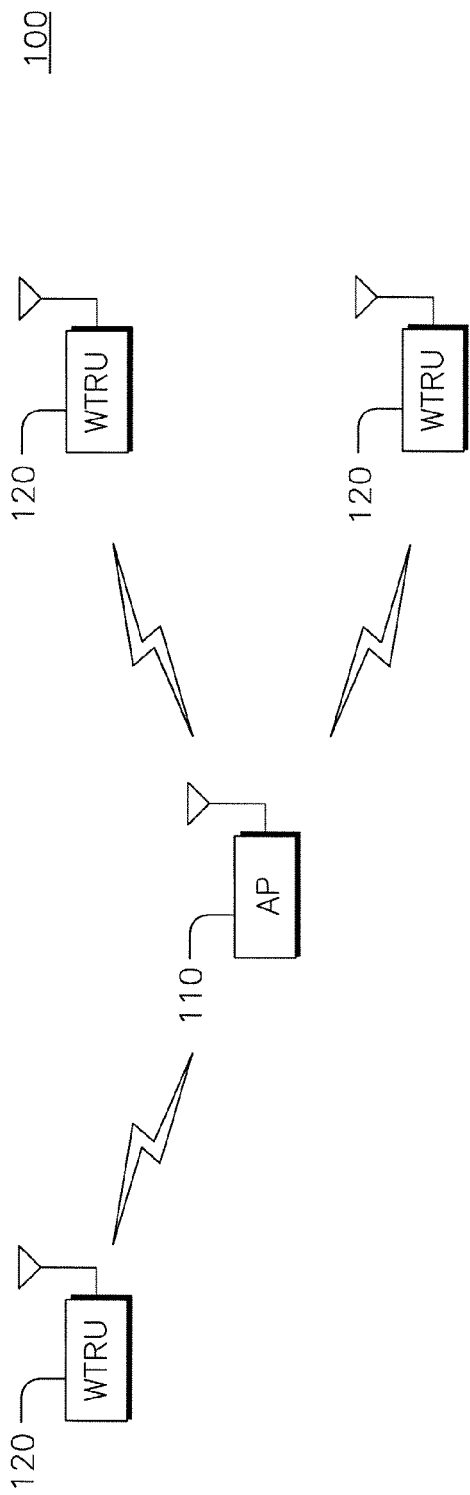
FIG. 1 shows an exemplary wireless system, including an access point (AP) and a plurality of wireless transmit/receive units (WTRUs), configured in accordance with the present invention.

Turning now to FIG. 1, there is shown an exemplary wireless communication system 100 configured in accordance with the present invention. The wireless communication system 100 includes a plurality of wireless communication devices, such as an AP 110 and a plurality of WTRUs 120, capable of wirelessly communicating with one another. Although the wireless communication devices depicted in the wireless communication system 100 are shown as APs and WTRUs, it should be understood that any combination of wireless devices may comprise the wireless communication system 100. That is, the wireless communication system 100 may comprise any combination of APs, WTRUs, stations (STAs), and the like.

For example, the wireless communication system 100 may include an AP and client device operating in an infrastructure mode, WTRUs operating in ad-hoc mode, nodes acting as wireless bridges, or any combination thereof. Additionally, in a preferred embodiment of the present invention, the wireless communication system 100 is a wireless local area network (WLAN). However, the wireless communication system 100 may be any other type of wireless communication system.

Figure 2:
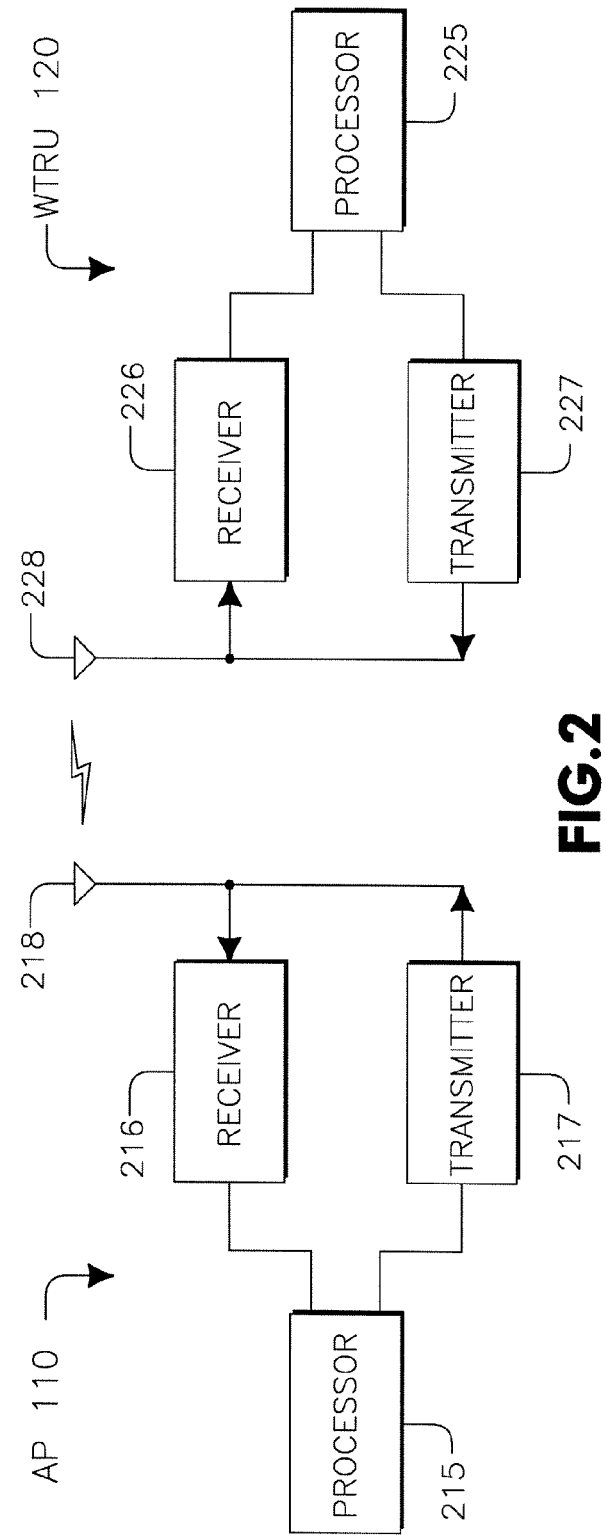
FIG. 2 is a functional block diagram of an AP and a WTRU of the wireless communication system of FIG. 1.

FIG. 2 is a functional block diagram of an AP 110 and a WTRU 120 of the wireless communication system 100 of FIG. 1. As shown in FIG. 2, the AP 110 and the WTRU 120 are in wireless communication with one another. In addition to the components that may be found in a typical AP, the AP 110 includes a processor 215, a receiver 216, a transmitter 217, and an antenna 218. The processor 215 is configured to generate, transmit, and receive data packets in accordance with the present invention. The receiver 216 and the transmitter 217 are in communication with the processor 215. The antenna 218 is in communication with both the receiver 216 and the transmitter 217 to facilitate the transmission and reception of wireless data.

Similarly, in addition to the components that may be found in a typical WTRU, the WTRU 120 includes a processor 225, a receiver 226, a transmitter 227, and an antenna 228. The processor 225 is configured to generate, transmit, and receive data packets in accordance with the present invention. The receiver 226 and the transmitter 227 are in communication with the processor 225. The antenna 228 is in communication with both the receiver 226 and the transmitter 227 to facilitate the transmission and reception of wireless data.

The present invention may be implemented in a WTRU or base station. The present invention is applicable to both the physical layer (PHY) and the digital baseband. The present invention may be implemented in wireless communication systems employing the following air interfaces: orthogonal frequency division multiplexing (OFDM), orthogonal frequency division multiple access (OFDMA), single carrier-frequency division multiple access (SC-FDMA), wideband code division multiple access (WCDMA), time division duplex (TDD), including HCR, LCR, and TDS-CDMA, frequency division duplex (FDD), IEEE 802.16e, and IEEE 802.11n air interfaces.

In one embodiment of the present invention feedback may be variable. The variable feedback may include a baseline codebook and one set of local codebooks. This set of local codebooks is correlated with a baseline codebook. Each local codebook in a local codebook set corresponds to and is correlated with each codeword in the baseline codebook. Codewords in codebooks can be vectors, matrices or vector subsets. The correlation may be used for designing a local codebook set based on factors, such as satisfaction of a certain range of channel variation rates, vehicle speed, Doppler shift, delay spread, frequency selectivity, coherence time and/or coherence bandwidth, and rank, for example. If the baseline codebook has 16 codewords, and each local codebook in the local codebook set has 4 codewords, the feedback typically requires 4 bits for the baseline codebook and 2 bits for the local codebook. Feedback can be 4 bits, 2 bits or a variable number up to 4 bits.

Feedback may also be variable and preferably based on channel conditions or other similar factors. The variable feedback may include a baseline codebook, and more than one set of local codebooks. Depending on channel conditions one of the local codebook sets preferably is used. The baseline codebook preferably is predetermined. Codewords in codebooks can be vectors, matrices, vector subsets and the like. Each local codebook is generated from and is a subset of the baseline codebook. Each local codebook in a local codebook set may be relatively small as compared to the baseline codebook, which results in reduced signaling overhead. However, each local codebook in a local codebook set may be sufficiently large so that the local codebook may track the channel variation. A receiver may select the appropriate set of codebooks based on a rate of channel variation, degree of frequency selectivity, or another channel condition. These factors may be combined.

Figure 3:
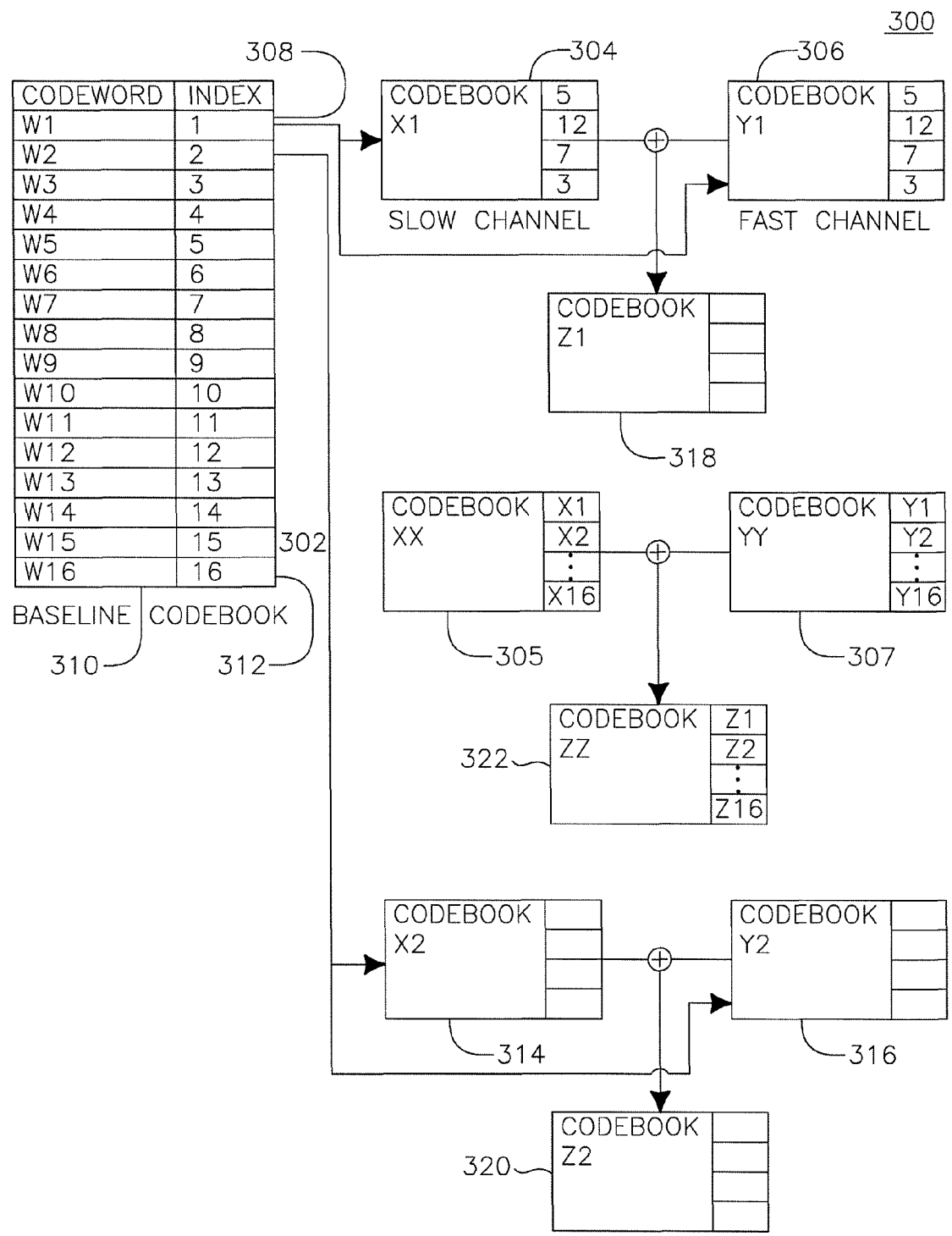
FIG. 3 is a block diagram of a baseline codebook and local codebooks in accordance with one embodiment of the present invention.

FIG. 3 is a block diagram of a baseline codebook and local codebooks in accordance with one embodiment of the present invention. FIG. 3 shows a baseline codebook 302, local codebook X 304, local codebook set XX 305, local codebook Y 306 and local codebook set YY 307. This embodiment should include one baseline codebook and more than one local codebook set. Each codeword in the baseline codebook 302 has an associated set of local codebooks. The baseline codebook 302 includes, for example, 16 codewords 310, each with a codeword index 312. Local codebook X1 304 and local codebook Y1 306 are generated from the sixteen codewords 310 in the baseline codebook 302 and are associated with the codeword at codeword index 1 (308). Local codebook X2 314 and local codebook Y2 316 are generated from the sixteen codewords 310 in the baseline codebook 302 and are associated with the codeword at codeword index 2. Local codebook set XX 305 is the set of codebooks that contains local codebooks X1 through X16. The local codebook set YY 307 is the set of codebooks that contains local codebook sets Y1 through Y16. As shown in FIG. 3, for the codeword at codeword index 1 308 local codebook X1 304 is generated by taking the codewords associated with codeword index 5, codeword index 12, codeword index 7 and codeword index 3 from the baseline codebook 302. Local codebook Y1 306 is generated by taking the codewords associated with codeword index 6, codeword index 9, codeword index 4 and codeword index 8 from the baseline codebook 302.

Preferably, a correlation between each of the baseline codewords is used as a criterion for generating each of the local codebooks (304, 306). The correlation between codewords can be used as a criterion for generating the local codebooks. This can be done in time domain and/or in frequency domain. For slow channel variation, the selected codeword should have a high correlation in time with the codeword in use at the time the local codebook is being generated. For fast channel variation, the selected codeword preferably has a low correlation in time with the codeword in use at the time the local codebook is being generated. For small frequency selectivity, the selected codeword should have a high correlation in frequency with the codeword in use at the time the local codebook is being generated. For large frequency selectivity, the selected codeword preferably has a low correlation in frequency with the codeword in use at the time the local codebook is being generated.

Turning again to FIG. 3, local codebook X1 304 and local codebook Y1 306 are associated with the codeword at codeword index 1 308 of the baseline codebook 302. Local codebook X1 304 is a slow channel codebook. The codewords associated with codeword indices 5, 12, 7 and 3 have a high correlation with the codeword associated with codeword index 1 308 of the baseline codebook 302. Therefore, if the codeword associated with codeword index 1 308 of the baseline codebook 302 is in use when codebook X 304 is generated, codebook X should be populated with those codewords that have a high correlation with codeword associated with codeword index 1 (308).

Continuing in FIG. 3, local codebook Y1 is a fast channel codebook. The codewords associated with codeword indices 6, 9, 4 and 8 have a low correlation with the codeword associated with codeword index 1 308 of the baseline codebook 302. Therefore, if the codeword associated with codeword index 1 308 of the baseline codebook 302 is in use when local codebook Y1 304 is generated, local codebook Y1 should be populated with those codewords that have a low correlation with a codeword associated with codeword index 1 308. At least one local codebook is generated for each of the codewords in the baseline codebook 302.

Local codebook X1 304 and local codebook Y1 306 are associated with the codeword at codeword index 1 308 of the baseline codebook 302. Local codebook X1 304 is a "small frequency selectivity channel" codebook. The codewords associated with codeword indices 5, 12, 7 and 3 have a high correlation, in frequency, with the codeword associated with codeword index 1 308 of the baseline codebook 302. Therefore, if the codeword associated with codeword index 1 308 of the baseline codebook 302 is in use when codebook X1 304 is generated, codebook X1 should be populated with those codewords that have a high correlation in frequency with the codeword associated with codeword index 1 308.

Local codebook Y1 is a "large frequency selectivity channel" codebook. The codewords associated with codeword indices 6, 9, 4 and 8 have a low correlation, in frequency with the codeword associated with codeword index 1 308 of the baseline codebook 302. Therefore, if the codeword associated with codeword index 1 308 of the baseline codebook 302 is in use when local codebook Y1 304 is generated, local codebook Y1 should be populated with those codewords that have a low correlation in frequency with the codeword associated with codeword index 1 308. At least one local codebook is generated for each of the codewords in the baseline codebook 302.

If the channel condition is slow at the time the codeword at codeword index 1 308 is being used for feedback, an optimal codeword from among the codewords in local codebook X1 304 is selected to be used for the next feedback signal. More particularly, the codeword that has the highest correlation with the codeword at index 1 308 is selected from the codewords associated with codeword index 5, codeword index 12, codeword index 7 and codeword index 3 from the baseline codebook 302. If the channel condition is fast at the time that the codeword at codeword index 1 308 is being used for feedback, the optimal codeword is selected from the codewords in local codebook Y1 306 for use with the next feedback signal. More particularly, the codeword that has the highest correlation with the codeword represented by codeword index 1 308 is selected from the codewords associated with codeword index 6, codeword index 9, codeword index 4 and codeword index 8 from the baseline codebook 302.

Local codebook set XX 305 and local codebook set YY 307 can be combined into a local codebook set. The local codebook set may include a combination of each local codebook in local codebook set XX 305 and its corresponding local codebook in local codebook set YY 307. Local codebook X1 304 and local codebook Y1 306 may be combined into a local codebook Z1 318. Local codebook X2 314 and local codebook Y2 316 may be combined into a local codebook Z2 320. The local codebook set ZZ 322 contains local codebooks Z1 through Z16. Local codebook set ZZ 322 can also be formed by combining two or more local codebook sets. The local codebook set ZZ 302 can also be formed by designing the codewords and local codebooks based on certain design factors. Feedback can be variable and may depend on channel condition when only one local codebook set is used.

In an additional embodiment of the present invention, feedback should be variable depending on a channel condition or a similar factor. Local codebooks may be generated from a baseline codebook. In this additional embodiment, each of the local codebooks may contain codewords that are similar to each other as well as codewords that are different. This "overlapping" of codewords in each of the local codebooks may result in improved detection accuracy when channel variation is in a transition zone, that is, when channel variation is between slow and fast, and/or when frequency selectivity is in a transition zone, that is, when frequency selectivity is between small and large selectivity.

Figure 4:
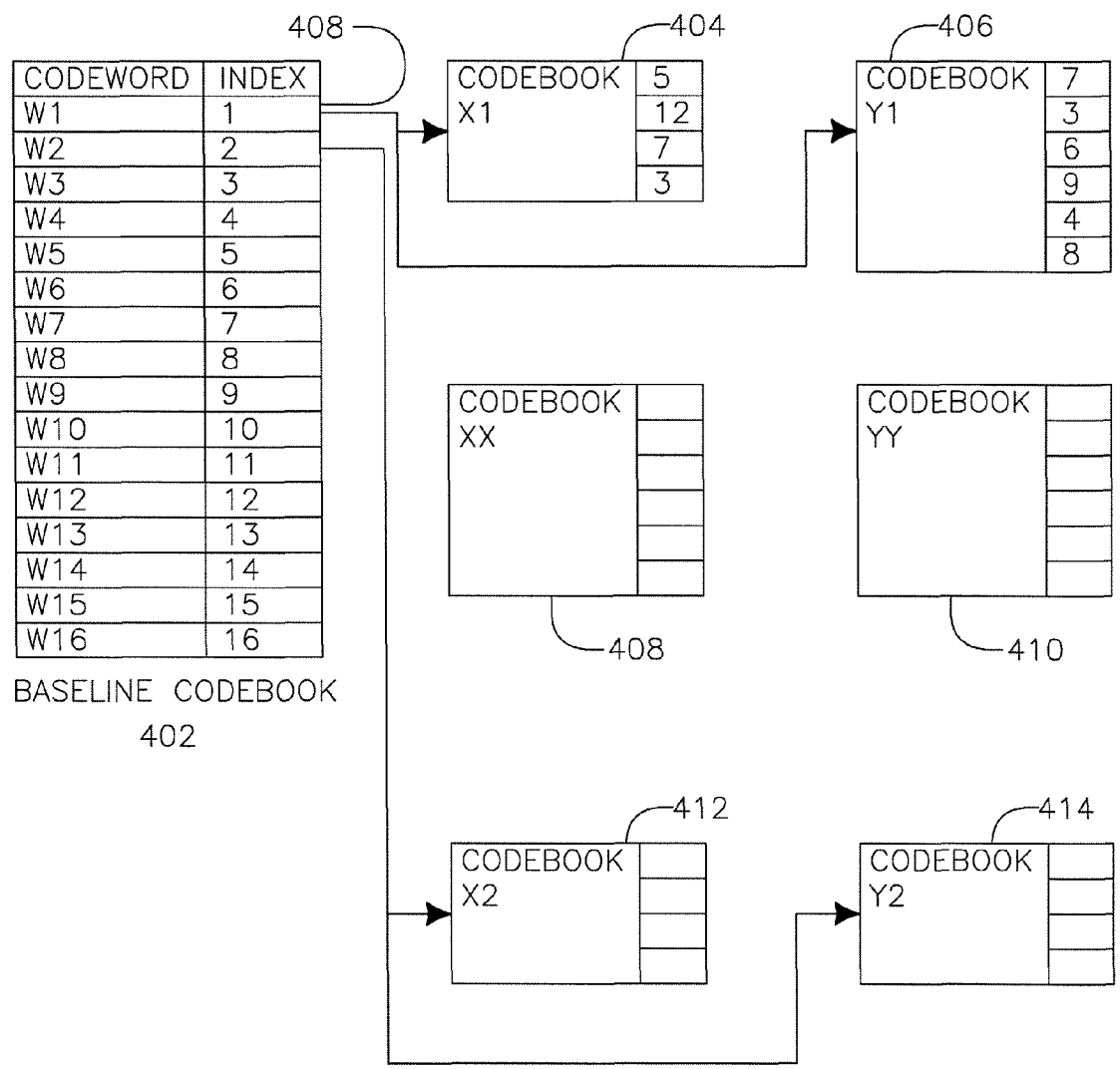
FIG. 4 is a block diagram of a baseline codebook and local codebooks in accordance with an additional embodiment of the present invention.

FIG. 4 is a block diagram of a baseline codebook and local codebooks in accordance with an additional embodiment of the present invention. Local codebook X1 404 and local codebook Y1 406 overlap. Each local codebook in local codebook set XX 408 and local codebook set YY 410 overlap. Local codebook X2 412 and local codebook Y2 414 overlap. As shown in FIG. 4, a local codebook X1 404 includes the codewords that correspond to codeword indices 5, 12, 7 and 3 of the baseline codebook 402. A local codebook Y1 406 includes the codewords that correspond to codeword indices 6, 9, 4, and 8 of the baseline codebook 402 as well as the codewords that correspond to codeword indices 7 and 3 of the baseline codebook 402. Both local codebook X1 404 and local codebook Y1 406 include the codewords that correspond to the codeword indices 7 and 3 of the baseline codebook 402. The number of codewords that are included in both local codebook X1 404 and local codebook Y1 406 and the particular codewords that overlap between local codebooks X1 and Y1 may be a design parameter that preferably is optimized through design processes such as simulations. The number of codewords that are included in both local codebook X1 404 and local codebook Y1,406 may also be a design parameter that preferably is optimized through design processes such as simulations.

Figure 5:
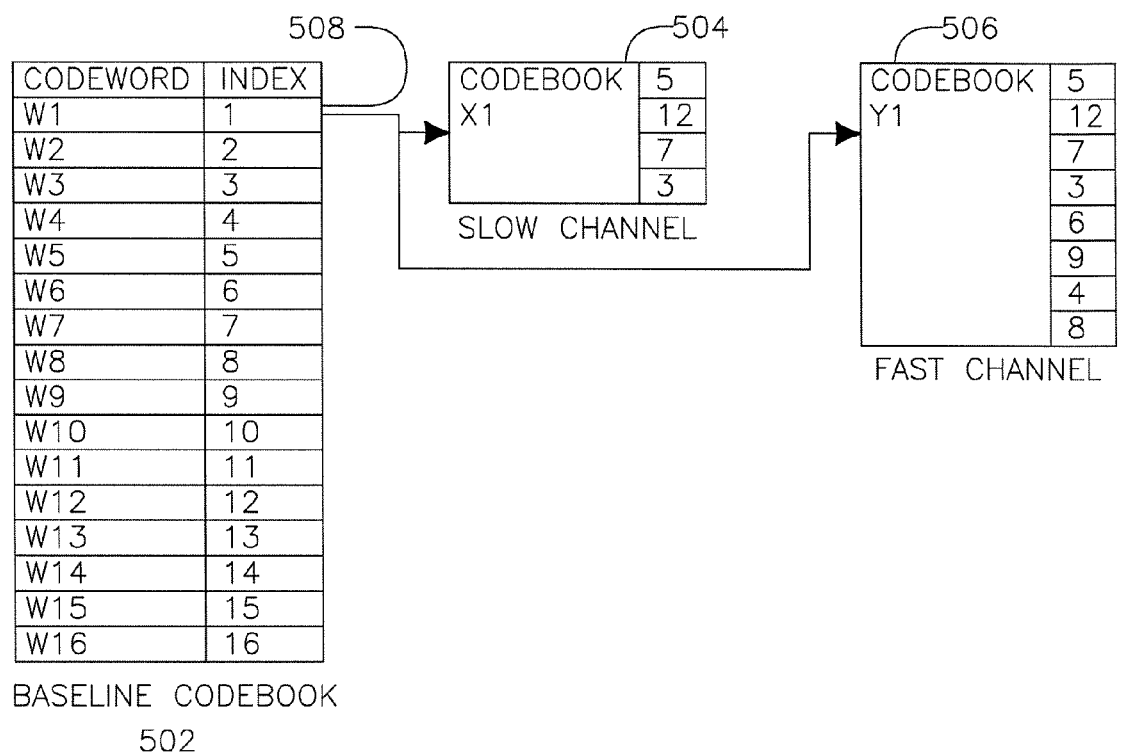
FIG. 5 is a block diagram of a baseline codebook and local codebooks in accordance with another embodiment of the present invention.

FIG. 5 is a block diagram of a baseline codebook and local codebooks in accordance with another embodiment of the present invention. Local codebook X1 504 is a subset of local codebook Y1 506. As shown in FIG. 5, a local codebook X1 504 includes the codewords that correspond to codeword indices 5, 12, 7 and 3 of the baseline codebook 502. A local codebook Y1 506 includes the codewords that correspond to codeword indices 6, 9, 4, and 8 of the baseline codebook 502 as well as the codewords that correspond to codeword indices 5, 12, 7 and 3 of the baseline codebook 502. Both local codebook X1 504 and local codebook Y1 506 include the codewords that correspond to the codeword indices 5, 12, 7 and 3 of the baseline codebook 502. Local codebook Y1 506 includes all the codewords contained in local codebook X1 504. The number of codewords that are included in both local codebook X1 504 and local codebook Y1 506 may be a design parameter that preferably is optimized through design processes such as simulations.

Figure 6:
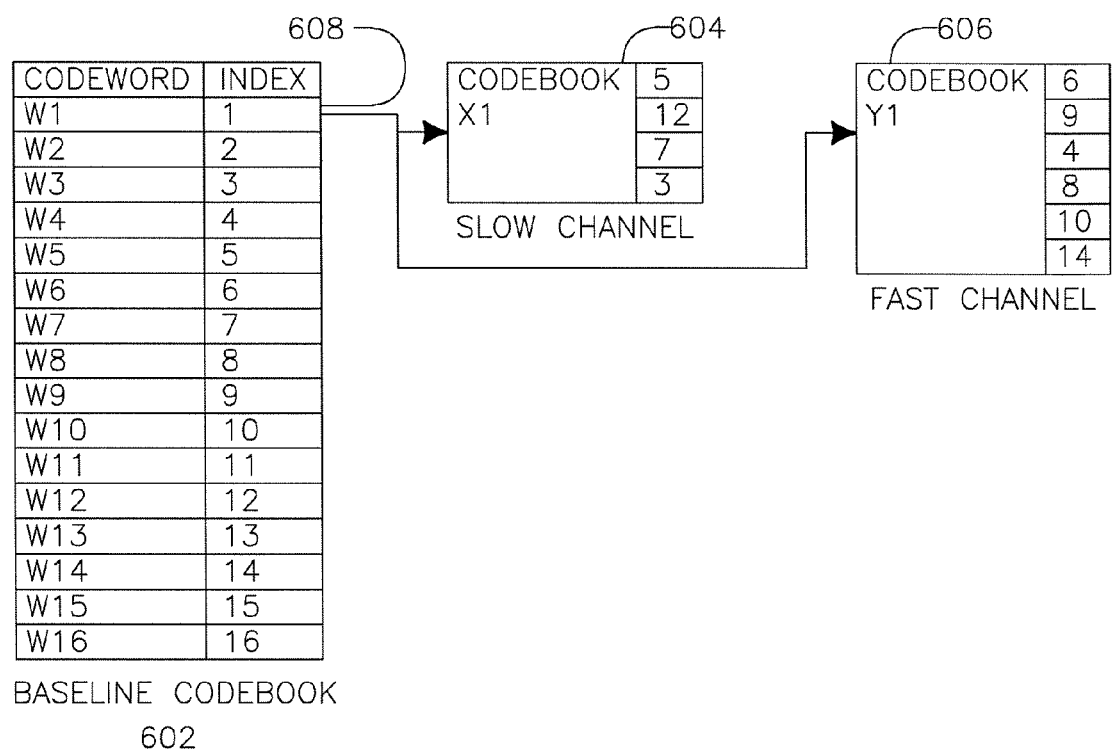
FIG. 6 is a block diagram of a baseline codebook and local codebooks in accordance with another embodiment of the present invention.

FIG. 6 is a block diagram of three codebooks in accordance with another embodiment of the present invention. In this embodiment, feedback should be variable and depend on channel conditions. Furthermore, the local codebooks should be of different sizes. This should result in increased design flexibility and an efficient balance of complexity, overhead and performance. As shown in FIG. 6, local codebook X1 604 includes codewords that correspond to codeword indices 5, 12, 7 and 3 of baseline codebook 602. In FIG. 6, local codebook X1 604 has four (4) entries. Local codebook Y1 606 includes the codewords that correspond to codeword indices 6, 9, 4, 8, 10 and 14 of baseline codebook 602. Local codebook Y1 606 has six (6) entries. None of the entries in local codebook X1 604 are the same as local codebook Y1 606. While FIG. 6 shows the local codebooks (604, 606) with four (4) and six (6) entries respectively, this is a design parameter that may be altered.

Variable feedback may be implemented with one baseline codebook and one or more local codebooks, in general. The baseline codebook may have any number of entries, including, but not limited to, two, four, eight, sixteen, thirty two and sixty four. Local codebooks may have the same number of entries, or different number of entries. A typical number of entries for a local codebooks may include 2, 4, 6, 8 and 16, but other sizes may be used as well. Channel variation may typically be measured in terms of channel correlation, channel variation rate, vehicle speed, Doppler shift, or phase changes. Other measurements of channel variation may also be employed. Frequency selectivity may typically be measured in terms of the length of delay spread. Other measurements of frequency selectivity may also be employed.

One local codebook set can also be implemented instead of two local codebook sets. Three or more local codebook sets instead of one or two local codebook sets with proper selection of codewords and correlation can also be implemented.

Although the features and elements of the present invention are described in the preferred embodiments in particular combinations, each feature or element can be used alone without the other features and elements of the preferred embodiments or in various combinations with or without other features and elements of the present invention. The methods or flow charts provided in the present invention may be implemented in a computer program, software, or firmware tangibly embodied in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) module

What is claimed is:

1. A wireless transmit/receive unit (WTRU) comprising a processor configured to select a pre-coding codeword from a first codebook, the first codebook comprising a plurality of pre-coding codewords divided into a plurality of subsets of pre-coding codewords, wherein the selected pre-coding codeword is selected from a selected one of said subsets of pre-coding codewords, wherein the selected subset is selected based on rank.

2. The WTRU of claim 1, wherein the processor is further configured to cause the WTRU to transmit an index of the selected codeword in the selected subset.

3. The WTRU of claim 2, wherein the first codebook includes 64 entries and the plurality of subsets of the first codebook include 16 entries.

4. The WTRU of claim 2, wherein a first subset of the plurality of subsets of the first codebook has a different number of entries that the processor is configured to select from than a second subset of the plurality of subsets of the first codebook.

5. A method for use in a wireless transmit/receive unit (WTRU), the method comprising selecting a pre-coding codeword from a first codebook, the first codebook comprising a plurality of pre-coding codewords divided into a plurality of subsets of pre-coding codewords, wherein the selected pre-coding codeword is selected from a selected one of said subsets of pre-coding codewords, wherein the selected subset is selected based on rank.

6. The method of claim 5, further comprising:
   transmitting an index of the selected codeword in the selected subset.

7. The method of claim 6, wherein the first codebook includes 64 entries and the plurality of subsets of the first codebook include 16 entries.

8. The method of claim 6, wherein a first subset of the plurality of subsets of the first codebook has a different number of entries than a second subset of the plurality of subsets of the first codebook.

* * * * *

UNITED STATES PATENT AND TRADEMARK OFFICE
CERTIFICATE OF CORRECTION

PATENT NO. : 9,749,158 B2
APPLICATION NO. : 11/746330
DATED : August 29, 2017
INVENTOR(S) : Kyle Jung-Lin Pan et al.

It is certified that error appears in the above-identified patent and that said Letters Patent is hereby corrected as shown below:

On the Title Page

In the reference section "OTHER PUBLICATIONS", "3GPP, 3rd Generation Partnership Proiect; Technical Specification Group Radio Access Network; Physical Layer Aspects for Evolved UTRA (Release 7), 3GPP TR25.814 V1.2.2 (Mar. 2006), (Mar, 2006)" should read --3GPP, 3rd Generation Partnership Project; Technical Specification Group Radio Access Network; Physical Layer Aspects for Evolved UTRA (Release 7), 3GPP TR25.814 V1.2.2 (Mar. 2006)--.

Signed and Sealed this
Fourteenth Day of August, 2018

Andrei Iancu
*Director of the United States Patent and Trademark Office*